United States Patent
MacWilliams et al.

(10) Patent No.: US 6,336,159 B1
(45) Date of Patent: *Jan. 1, 2002

(54) METHOD AND APPARATUS FOR TRANSFERRING DATA IN SOURCE-SYNCHRONOUS PROTOCOL AND TRANSFERRING SIGNALS IN COMMON CLOCK PROTOCOL IN MULTIPLE AGENT PROCESSING SYSTEM

(75) Inventors: Peter D. MacWilliams, Aloha, OR (US); William S. Wu, Cupertino, CA (US); Dilip K. Sampath, Sunnyvale, CA (US); Bindi A. Prasad, Los Altos, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,322

(22) Filed: Jan. 13, 1998

Related U.S. Application Data

(63) Continuation-in-part of application No. 08/881,941, filed on Jun. 25, 1997, now Pat. No. 5,919,254.

(51) Int. Cl.[7] .............................................. G06F 13/42
(52) U.S. Cl. ...................................... 710/105; 713/400
(58) Field of Search ......................... 710/105; 713/400

(56) References Cited

U.S. PATENT DOCUMENTS

| | | | |
|---|---|---|---|
| 4,353,128 A | | 10/1982 | Cummiskey .................. 370/44 |
| 4,525,849 A | * | 7/1985 | Wolf .......................... 375/372 |
| 4,807,192 A | * | 2/1989 | Nakano et al. |
| 4,908,823 A | | 3/1990 | Haagens et al. ........... 370/85.1 |
| 5,280,587 A | * | 1/1994 | Shimodaira et al. |
| 5,359,232 A | * | 10/1994 | Eitrheim et al. ............. 310/328 |
| 5,381,543 A | * | 1/1995 | Blomgren et al. ........... 710/128 |
| 5,590,369 A | | 12/1996 | Burgess et al. .............. 395/800 |
| 5,640,599 A | * | 6/1997 | Roskowski et al. ............ 710/29 |
| 5,727,171 A | * | 3/1998 | Iachetta, Jr. |
| 5,754,825 A | | 5/1998 | Hausauer et al. ........... 395/500 |
| 5,809,291 A | * | 9/1998 | Munoz-Bustamante et al. |
| 5,826,067 A | * | 10/1998 | Fisch et al. .................. 713/503 |
| 5,829,026 A | * | 10/1998 | Leung et al. ................ 711/122 |
| 5,842,029 A | * | 11/1998 | Conary et al. ............... 713/322 |
| 5,802,356 A | | 12/1998 | Gaskins et al. ............. 395/551 |
| 5,844,858 A | * | 12/1998 | Kyung ........................ 365/233 |

(List continued on next page.)

OTHER PUBLICATIONS

Accelerated Graphics Port Interface Specification Revision 1.0, Jul. 31, 1996.*
Dictionary of Computers, Information Processing & Telecommunications. 1987 pp. 31 and 623.*

*Primary Examiner*—Paul R. Myers
(74) *Attorney, Agent, or Firm*—Blakely, Sokoloff, Taylor & Zafman LLP

(57) ABSTRACT

A method and apparatus for transferring data between bus agents in a computer system. The present invention includes transmitting a control signal, from a first agent to a second agent, via a first transfer protocol; and, transmitting data corresponding to the control signal, from the first agent to the second agent, via a second transfer protocol. In one embodiment, the control signals are transmitted from the first agent to the second agent via a synchronous transmission with respect to a bus clock; and, the data is transmitted via an asynchronous transmission with respect to the bus clock, which has a data width greater than the synchronous transmission. In addition, in one embodiment of the present invention, the synchronous transmission is a common clock data transfer protocol, and the asynchronous transmission is a source clock data transfer protocol.

191 Claims, 6 Drawing Sheets

U.S. PATENT DOCUMENTS

| | | | |
|---|---|---|---|
| 5,893,135 A | * | 4/1999 | Hasbun et al. |
| 5,901,304 A | * | 5/1999 | Hwang et al. |
| 5,905,391 A | * | 5/1999 | Mooney ..................... 327/161 |
| 5,919,254 A | * | 7/1999 | Pawlowski et al. ......... 710/104 |
| 5,964,856 A | * | 10/1999 | Wu et al. ................... 710/110 |
| 5,978,869 A | * | 11/1999 | Guthrie et al. ................ 710/60 |
| 5,999,023 A | * | 12/1999 | Kim ........................... 327/144 |
| 6,092,156 A | * | 7/2000 | Schibinger et al. ......... 711/145 |
| 6,108,736 A | * | 8/2000 | Bell ........................... 710/107 |

* cited by examiner

METHOD AND APPARATUS FOR TRANSFERRING DATA IN SOURCE-SYNCHRONOUS PROTOCOL AND TRANSFERRING SIGNALS IN COMMON CLOCK PROTOCOL IN MULTIPLE AGENT PROCESSING SYSTEM

CROSS-REFERENCE TO RELATED APPLICATIONS

This application is a continuation-in-part of U.S. patent application 08/881,941 filed Jun. 25, 1997, entitled METHOD AND APPARATUS FOR SWITCHING BETWEEN SOURCE-SYCHRONOUS AND COMMON CLOCK DATA TRANSFER MODES IN A MULTIPLE PROCESSING SYSTEM, issued as U.S. Pat. No. 5,919,254 on Jul. 6, 1999. The above-identified co-pending application is assigned to the same assignee as the present application.

FIELD OF THE INVENTION

The present invention relates to the field of data transmission in computer systems.

BACKGROUND OF THE INVENTION

Modern computer systems typically include multiple agents each coupled to a system bus. Typically, the agents are integrated circuit packages with multiple interfaces coupling each agent to the bus. The agents may include, for example, processors, memory devices, mass storage devices, etc. In order for the computer system to operate properly, agents should be able to communicate effectively with each other via the bus.

Existing computer systems typically transfer data between components or agents in accordance with a predefined clocking scheme. A system bus clock typically clocks data out of a sending device and into a receiving device. Consequently, it takes at least one complete clock cycles of a system bus clock to transfer data from one device to another device.

However, data may also be transferred in a source synchronous fashion in order to increase the speed of data transmission. In source synchronous transmission, a strobe is sent with a data transmission. This strobe latches the data into the receiving device in a time period that is typically shorter than the period of the system bus clock.

The source synchronous latched protocol operates a bus at a greater frequency. For example, two chunks of data may be driven onto the bus in the time it would take to drive one chunk in common clock transmission.

As a result, it would be advantages to provide a system that transmits data using a source synchronous protocol while transmitting control signals using a common clock protocol in order to increase the bandwidth of transmitting data without a corresponding increase in the number of signals transmitted.

SUMMARY OF THE INVENTION

The present invention provides a method and apparatus for transferring data between bus agents in a computer system. The present invention includes transmitting a control signal, from a first agent to a second agent, via a first transfer protocol; and, transmitting data corresponding to the control signal, from the first agent to the second agent, via a second transfer protocol.

DETAILED DESCRIPTION

A method and apparatus for transferring control signals via a common clock protocol and transferring data via source synchronous protocol in a computer system is described. The transmission of the control signals is clocked by a system bus clock, while the transition of the data is clocked by strobes transmitted by the data source.

Figure 1:
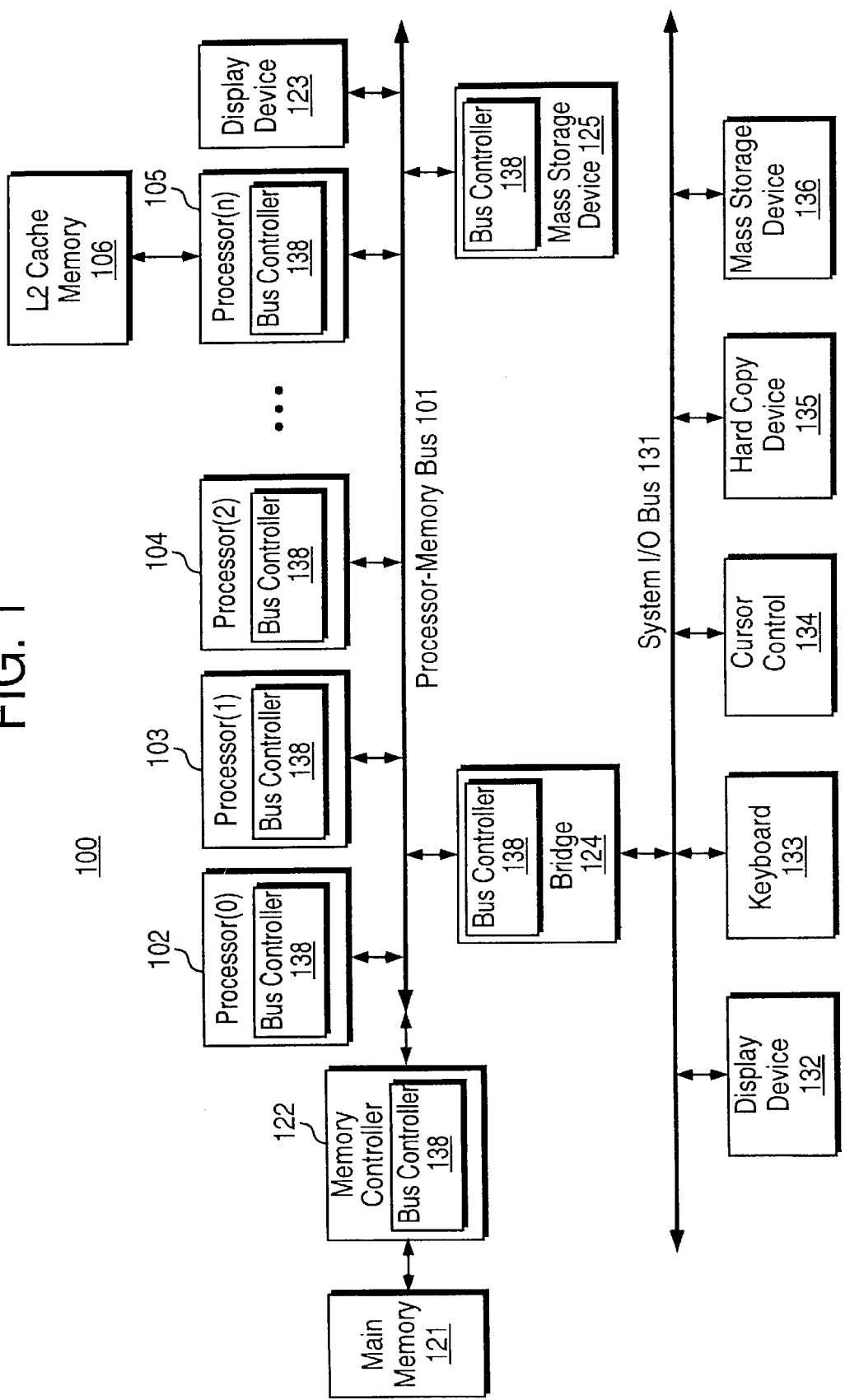
FIG. 1 is a block diagram of a multiple agent computer system according to the present invention.

FIG. 1 is a block diagram of a multi-processor computer system which may be used with embodiments of the present invention. Computer system 100 comprises processor-memory bus 101 for communication between different agents coupled to bus 101, such as processors, bus bridges, memory devices, peripheral devices, etc. Processor-memory bus 101 includes arbitration, address, data and control busses (not shown). In one embodiment, each of processors 102, 103, 104, and 105 include a small, extremely fast internal cache memory (not shown), commonly referred to as a level one (L1) cache memory for temporarily storing data and instructions on the same integrated circuit as its associated processor. In addition, a larger, level two (L2) cache memory 106 is coupled to processor 105 for temporarily storing data and instructions for use by processor 105. In other embodiments, an L2 cache such as memory 106 can be coupled to any one of processors 102–105.

Processor-memory bus 101 provides access to the memory and input/output (I/O) subsystems. Memory controller 122 is coupled to processor-memory bus 101 for controlling access to a random access memory (RAM) or other dynamic storage device 121 (commonly referred to as main memory) for storing information and instructions for processors 102–105. Display device 132, keyboard device 133, cursor control device 134, hard copy device 135, and mass storage device 136 are coupled to system I/O bus 131 and to processor-memory bus 101 through bus bridge 124. Bridge 124 is coupled to processor-memory bus 101 and system I/O bus 131 to provide a communication path or gateway for devices on either processor-memory bus 101 or I/O bus 131 to access or transfer data between devices on the other bus. Bridge 124 is an interface between system I/O bus 131 and processor-memory bus 101. I/O bus 131 communicates information between peripheral devices 132–136.

Processors 102–105, bus bridge 124, mass storage device 125, and memory controller 122 each include a bus controller 138. Bus controller 138 controls communication over processor-memory bus 101 when the agent containing it has control of processor-memory bus 101.

In one embodiment of the present invention, bus activity on processor-memory bus 101 is hierarchically organized into operations, transactions, and phases. An operation is a bus procedure that appears atomic to software, such as reading a naturally aligned memory location. Executing an operation usually requires one transaction but may require multiple transactions, as in the case of deferred replies in which requests and replies are different transactions, or in non-lined memory operations which software expects to be atomic. In this embodiment, a transaction is the set of bus activities related to a single request, from request bus arbitration to the completion of the transaction (for example, a normal or implicit writeback response) during the response phase.

In one embodiment, a transaction contains up to six distinct phases. However, certain phases are optional based on the transaction and response type. Alternatively, additional phases could also be added. A phase uses a particular signal group to communicate a particular type of information. In one implementation these phases are:

ARBITRATION PHASE
REQUEST PHASE
ERROR PHASE
SNOOP PHASE
RESPONSE PHASE
DATA TRANSFER PHASE

In one embodiment, the data transfer phase is optional and is used if a transaction is transferring data. The data phase is request initiated if the data is available at the time of initiating a request (for example, for a write transaction). The data phase is response initiated if the data is available at the time of generating the transaction response (for example, for a read transaction). A transaction may contain both a request initiated data transfer and a response initiated data transfer, for example, a write which is converted to an implicit writeback).

In one embodiment of the present invention, the signals transmitted in relation to the arbitration phase, request phase, error phase, snoop phase, and the response phase are transmitted via the common clock protocol (i.e., clocked by the system bus), as will be described in more detail below. Data transmitted during the data transfer phase, however, is transmitted via a source synchronous protocol in order to transfer a greater amount of data per clock cycle, as will also be described in more detail below.

Figure 2:
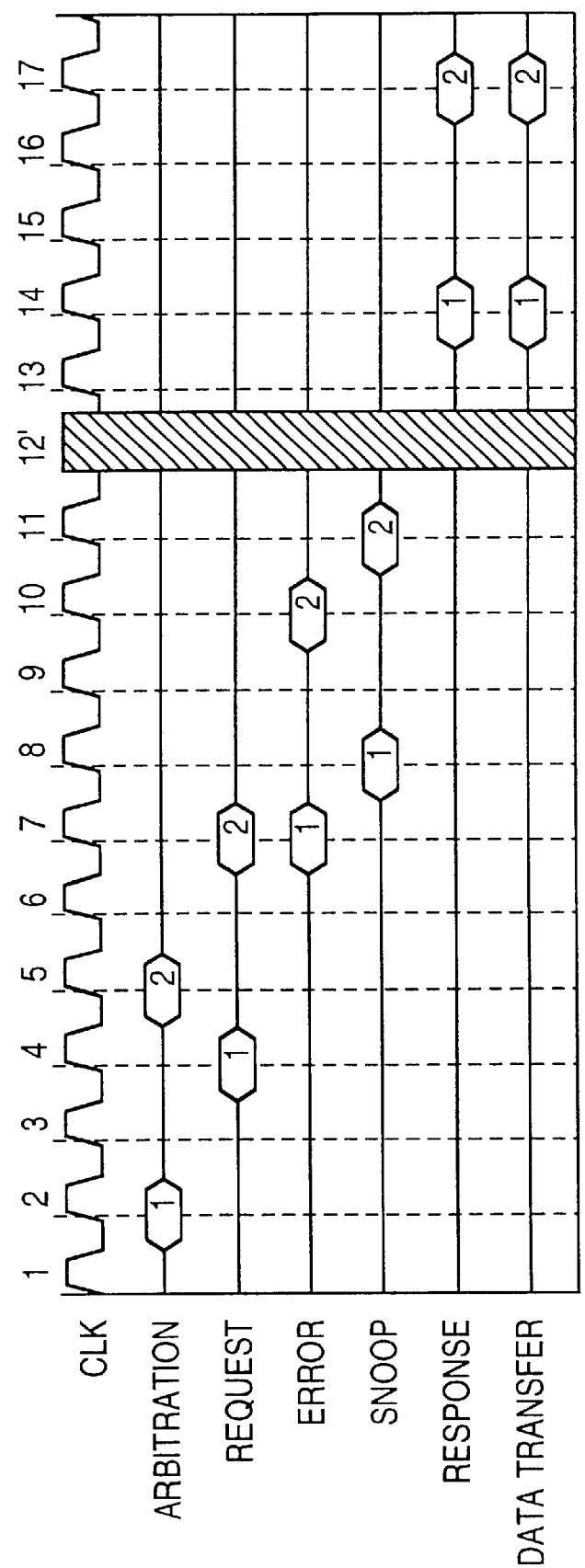
FIG. 2 is a diagram of transaction phases according to an embodiment of the present invention.

Different phases from different transactions can overlap, allowing bus usage to be pipelined and bus performance to be improved. FIG. 2 shows an example of overlap phases for two transactions. Referring to FIG. 2, transactions begin with an arbitration phase, in which a requesting agent becomes the bus owner. The arbitration phase needs to occur only if the agent that is driving the next transaction does not already own the bus. In one implementation, bus ownership is granted to the requesting agent in the arbitration phase two or more clock cycles after ownership is requested.

The second phase is the request phase in which the bus owner drives a request and address information on the bus. In one implementation the request phase is one or more clock cycles after bus ownership is granted (provided there is an arbitration phase), and is two clock cycles long. In the first clock an address signal is given along with the transaction type and sufficient information to begin snooping a memory access. In the second clock, byte enables used to identify which bytes of data should be transferred if the data transfer is less than the data bus width, the transaction identifier used to uniquely identify the transaction in the event a deferred response is to be given to the request, and the requested data transfer lengths are driven, along with other transaction information.

The third phase of a transaction is an error phase. The error phase indicates any immediate error, such as parity errors, triggered by the request. If an error is discovered, an error signal is asserted during the error phase by the agent which detected the error in the transaction. According to one embodiment, when an error is indicated, the transaction is immediately dropped (that is; the transaction progresses no further in the pipeline) and may be redriven by the agent which issued the transaction. Whether the agent reissues the transaction depends on the agent itself. In one implementation, the error phase is three clock cycles after the request phase.

In one embodiment, every transaction that is not canceled because of an error in the error phase has a snoop phase. The snoop phase indicates whether the cache line accessed in a transaction is not valid, valid or modified (dirty) in any agents' cache. In one implementation, the snoop phase is four or more clock cycles from the request phase.

The snoop phase of the bus defines a snoop window during which snoop events can occur on the bus. A snoop event refers to agents transmitting and/or receiving snoop results via the bus. An agent which has snoop results which need to be driven during the snoop phase drives these snoop results as a snoop event during the snoop window. All snooping agents coupled to the bus, including the agent driving the results, receive these snoop results as a snoop event during the snoop window. In one implementation the snoop window is a single bus clock.

The response phase indicates whether the transaction failed or succeeded, whether the response is immediate or deferred, whether the transaction will be retried, or whether the transaction includes data phases. If a transaction contains a response initiated data phase, then it enters the data transfer phase coincident with the response phase.

If the transaction does not have a data phase, then that transaction is complete at the response stage. If the requesting agent has write data to transfer or has requested read data, the transaction has a data phase which may extend beyond the response phase in the former case and will be coincident with or extend beyond the response phase in the latter case. The data phase occurs only if a transaction requires a data transfer. The data phase can be response initiated (for example, by the memory controller or another processor) or request initiated.

The bus accommodates deferred transactions by splitting a bus transaction into two independent transactions. The first transaction involves a request by a requesting agent and a response by the responding agent. The response includes the sending of the request data (or completion signals) if the responding agent is ready to respond. In this case, the bus transaction ends. However, if the responding agent is not ready to complete the bus transaction, then the responding agent may send a deferred response over the bus during the response phase. Sending of a deferred response allows other transactions to be issued and not held up by the completion of this transaction. When the responding agent is ready to complete the deferred bus transaction, the responding agent arbitrates for ownership of the bus and sends a deferred reply transaction which includes the requested data (or completion signals) on the bus.

Because, in this embodiment, the bus is of a pipeline nature, multiple transactions can be at different phases of the bus at different times, for example, one transaction can be at the snoop phase, while a second transaction is in the error phase, and a third transaction is in the request phase. Thus, error signals and request signals can both be issued concurrently on the bus even though they correspond to different transactions.

In one embodiment of the present invention, up to sixteen transactions can be outstanding on the bus at any particular time and up to sixteen transactions can be waiting for a deferred response at any particular time.

Additionally, one embodiment of the present invention also supports an implicit writeback, which is part of a read or write transaction. An implicit writeback occurs when a requesting agent places a request on the bus for a cache line which is stored in a modified state in a cache coupled to the bus. For example, an agent may perform a write transaction over the bus of 8 bytes of data (or some other amount of data less than or equal to a cache line), however, the cache line which includes those 8 bytes is stored in a modified state in another agent's cache. In this situation, the cache which contains the cache line in a modified state (or the agent which is coupled to the cache) issues a "hit modified" signal on the bus during the snoop phase for the transaction. The requesting agent places the 8 bytes of write data onto the bus, which are retrieved by the targeted agent. Then, coincident with the response phase of the transaction, the cache which contains the cache line in a modified state writes the cache line, which is 32 or 64 bytes in one implementation, to the bus. Any of the data in the cache line which was not written by the requesting agent is then merged with the write data from the original data transfer.

An implicit writeback may also occur with a read transaction. For example, a requesting agent may perform a read transaction which targets a memory controller on the bus, but which also hits a modified cache line in a snooping agents' cache memory. In this example, the snooping agent becomes the source agent and provides the requested data, as an implicit writeback, to the memory controller which in turns stores the writeback data into main memory. Also, in this example, the requesting agent takes the implicit writeback data from the bus (referred to as "snarfing" the data). In alternate embodiments, however, the memory controller may perform the snarfing, in which case the cache line will be taken off the bus by the requesting agent and may or may not be taken off the bus by the memory controller.

Figure 3:
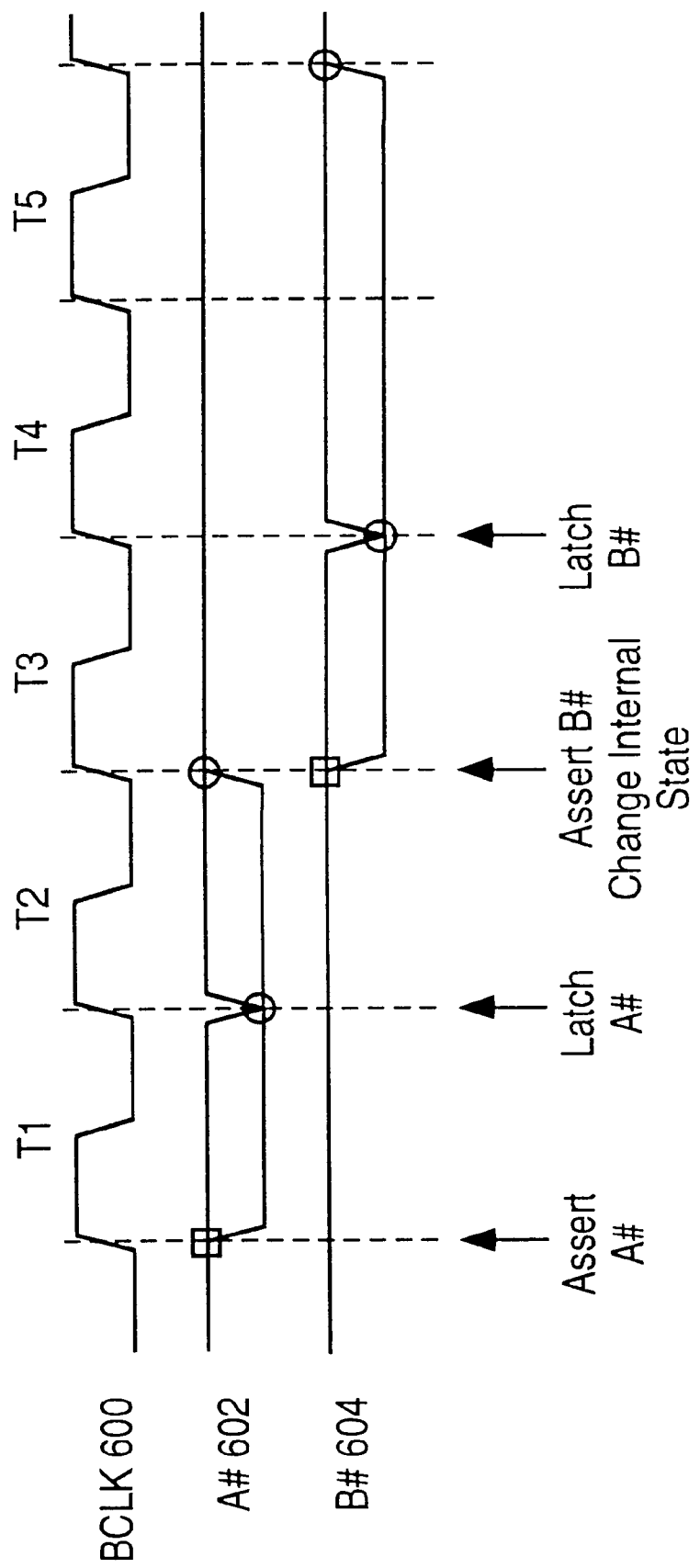
FIG. 3 is a timing diagram illustrating a common clock latched protocol.

FIG. 3 is a timing diagram showing what occurs on the bus during a common clock transaction for the transmission of control signals, in accordance with one embodiment of the present invention. In timing diagrams herein, a square symbol indicates that a signal is driven, a circle symbol indicates that a signal is sampled (latched, or captured), and a triangle symbol indicates that the signal is received, or observed.

Signal names herein use uppercase letters, such as ADS#. Signals in a set of related signals are distinguished by numeric suffixes, such as A 4 for address bit 4. A set of signals covering a range of numeric suffixes if denoted as, for example, D[63-0] for data bits 0 through 63. A "#" suffix indicates that the signal is active low. No "#" suffix indicates that the signal is active high. The logic levels at which certain signals are active are merely choices made for particular embodiments and are not essential to the invention. The term "asserted" implies that a signal is driven to its active logic level. The term "deasserted" implies that a signal is driven to its inactive logic level.

Bus clock signal BCLK 600 is active on its rising edge. At the start of clock cycle T1, signal A# 602 is asserted on the bus. At the start of T2, BCLK 600 latches signal A# 602. At the start of T3, B# 604 is asserted in response to the latching of A# 602. A# 602 changes state to its original, inactive state in T2. It can be seen from FIG. 3 that B# 604 is asserted in response to A# 602 two BCLK 600 cycles after A# 602 is asserted.

Figure 4:
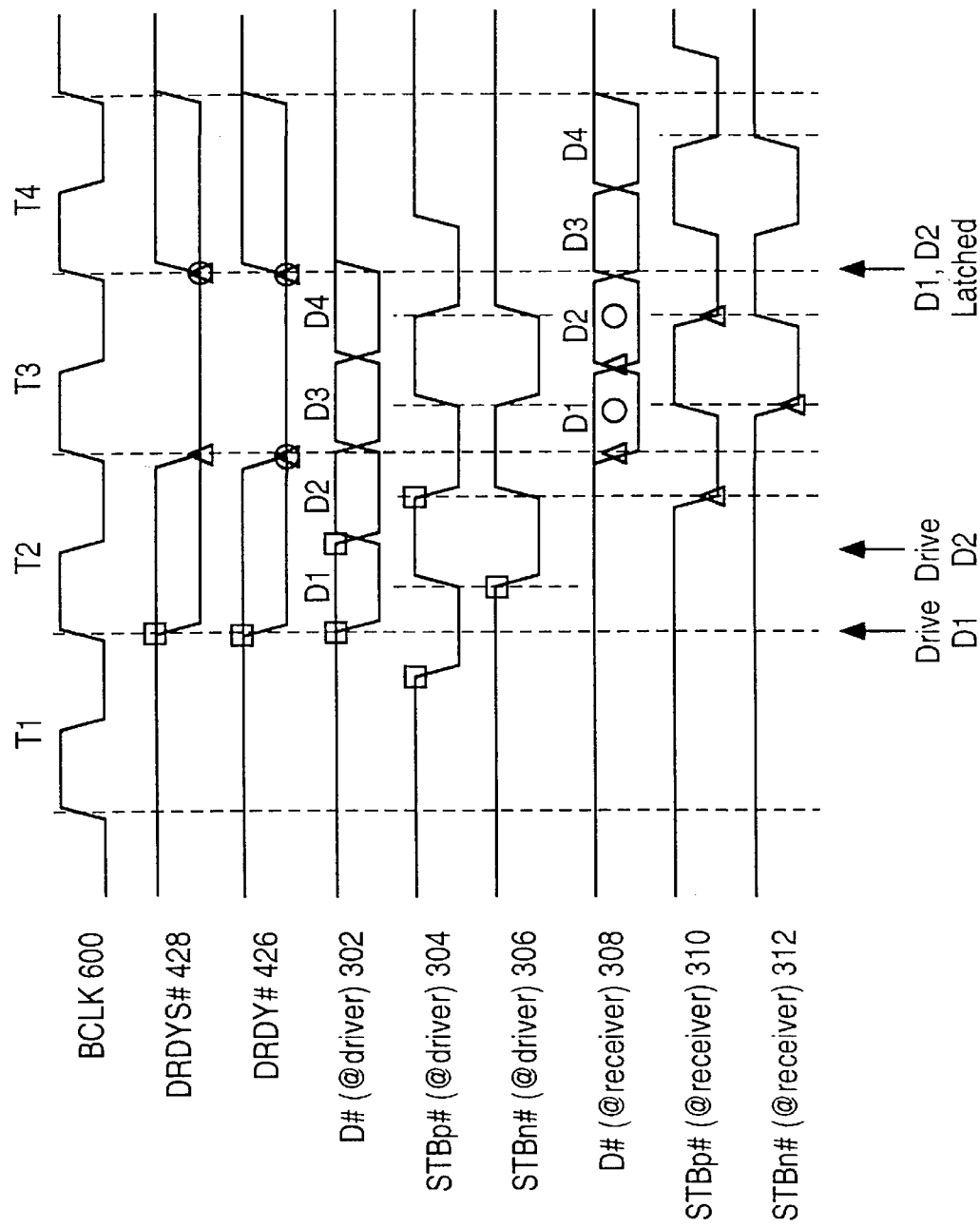
FIG. 4 is a timing diagram illustrating a source synchronous latched protocol according to an embodiment of the present invention.

FIG. 4 is a timing diagram illustrating source synchronous data transmission for the transfer of data, according to one embodiment. As a result, the present invention allows the transfer of a greater amount of data per bus clock cycle compared to transferring data via a common clock protocol. As shown in the example of four chunks of data, D1, D2, D3, and D4 are sent and received. BCLK 600 operates with its normal frequency just as in the common clock transaction shown in FIG. 3. According to the source synchronous protocol shown in FIG. 4, data is sent and latched with strobes STBp[3:0]# 310 and STBn[3:0]# 312 to allow transfer rates twice the common clock transfer rate with reasonable signal flight times. The source synchronous latched protocol operates the bus at twice the frequency of BCLK 600. Two chunks of data are driven onto the bus in the time it would take to drive one chunk in common clock transmission. Therefore, bandwidth may be doubled without a corresponding increase in the number of signals transmitted.

As explained in Table IV, signals DRDYS# 428 and DRDY# 426 both active indicate that the sender is sending data in a source synchronous 128-bit mode. D# 302 comprises the data signals as seen by the driver. D# 308 comprises the data signals as seen by the receiver. STBp[3:0]# 304 and STBn[3:0]# 306 are strobe signals as seen by the driver of the strobe signals. STBp[3:0]# 310 and STBn[3:0]# 312 are the strobe signals as seen by the receiver of the data and strobe signals. On both the rising edge and the 50% point of the bus clock, the driver sends new data. On both the 25% point and the 75% point of the bus clock, the driver sends centered differential strobes STBp[3:0]# 304 and STBn[3:0]# 306. The receiver captures the data with the strobes deterministically.

In one embodiment, the driver predrives STBp[3:0]# 304 before driving D[63:0]# 302. The driver sends a rising and falling edge on STBp[3:0]# 304 and STBn[3:0]# 306 centered with data. The driver deasserts the strobes after the last data is sent. The receiver captures valid data with both strobe signals, asynchronous to BCLK 600. Signals synchronous to BCLK 600 (DRDYS# 428 and DRDY# 426) indicate to the receiver that valid data has been sent. FIG. 4 illustrate that if both agents are capable of 128-bit data transmission, data can be transmitted in half the time with respect to BCLK 600 as with the common clock protocol as shown in FIG. 3.

Figure 5:
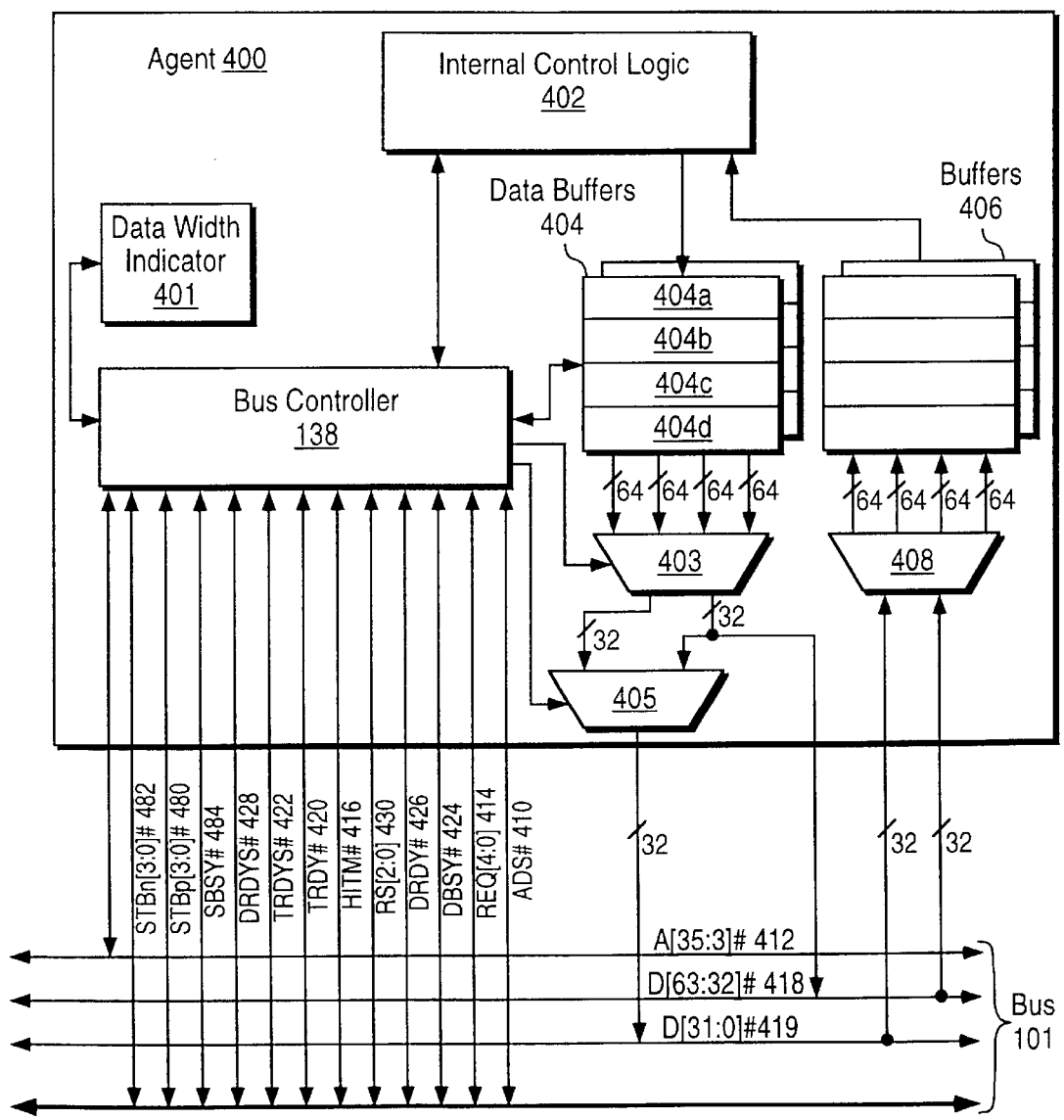
FIG. 5 is a block diagram of an agent according to one embodiment of the present invention.

FIG. 5 is a block diagram showing an agent in more detail according to one embodiment of the present invention. Agent 400 includes a data width indicator 401, internal control logic 402, bus controller 138, data buffers 404 and 406, and multiplexors 403, 405, and 408.

Data width indicator 401 is an indicator of the data transfer widths supported by agent 400. In one embodiment, data width indicator 401 is a two-bit value which encodes the data transfer which is supported by agent 400. Data width indicator 401, according to one embodiment, is a preconfigured value. Indicator 401 can be preconfigured in any of the wide range of convention manners, such as having particular interfaces of agent 400 connected to particular predetermined voltage levels which are sampled at system reset periods. In other embodiments data width indicator 401 may be reconfigurable. For example, data width indicator 401 may be stored in a memory device or may be part of a configuration register that can be written to by software. Bus controller 138 provides an interface between agent 400 and bus 101. Bus controller 138 transfers various control and address signals between bus 101 and also controls the transfer of data to and from bus 101. As shown, bus 101 has a 64-bit wide data bus. In other embodiments, other data bus widths may be used.

A summary of the signals used with the present invention is shown in Table I below. The interaction of these signals is discussed more fully below.

Table I is a summary of signals used with the present invention, but is not an exhaustive list of signals transmitted by agent 400 or bus 101, but includes those signals most pertinent to the present invention.

TABLE I

| Signal | Description |
| --- | --- |
| CLK | The bus clock. |
| ADS# | Address Strobe. Asserted by the requesting agent to indicate the beginning of the Request Phase for a transaction. |
| A[35:3]# | Address. The bus lines used to transfer the address for a request. |
| REQ[4:0]# | Request. Used to encode the particular request of the requesting agent, including the type of request (e.g., read, write, etc.) and length of the transfer. |
| REQb[4:3]# | Data size. Two of the REQ[4:0]# bits. Used by the requesting agent to encode the data transfer widths supported by the requesting agent. The "b" indicates the signals are driven in the second clock cycle of the Request Phase. |
| HITM# | Hit Modified. Asserted by a snooping agent to indicate that the request hit a modified cache line of an agent's cache. |
| DBSY# | Data Bus Busy. Asserted by the agent transferring data to indicate it is using or is about to use the data bus. |
| D[63:0]# | Data. The bus lines used to transfer the data (that is, the data bus). |
| DRDY#, DRDYS# | Data Ready. Asserted by the agent transferring data to indicate that valid data is on the bus and infers the data size supported by the transferring agent. |
| TRDY#, TRDYS# | Target Ready. Asserted by the agent which is receiving data to indicate that the agent is ready to accept the data and infers the data size supported by the receiving agent. |
| RS[2:0]# | Response Status. Asserted by the targeted agent to indicate the status of the response (e.g., Retry Response, Deferred Response, Failure, Implicit Writeback Response, or Normal (with or without data response). |
| SBSY# | Strobe Busy. Asserted by the transferring agent to indicate it is using or is about to use the strobe lines of the bus. |
| STBp[3:0]# STBn[3:0]# | Source synchronous positive and negative data strobes asserted by the transferring agent to capture valid data in the receiver. |

Agent 400 also includes two sets of data buffers 404 and 406. Agent 400 includes two sets of input buffers 406 and two sets of output buffers 404. However, alternate embodiments could include more or fewer data buffers or data buffers that could be used for both input and output rather than having two different sets of buffers.

Data buffers 404 temporarily store data that is being transferred from agent 400 to another agent via bus 101. According to one embodiment of the present invention, each of data buffers 404 comprise four separate buffers, 404a, 404b, 404c and 404d, each capable of storing 64 bits of data. Each of data buffers 404 is input into a multiplexor 403. Multiplexor 403 is controlled by bus controller 138, thereby allowing bus controller 138 to control which 64-bit portion of data is provided to data lines D[63:32]# 418 and D[31:0]# 419 at any particular time. The output of multiplexor 403 is then input into a second multiplexor 405 which is also controlled by bus controller 138. Multiplexor 405 takes the 64 bits of data from multiplexor 403 and places either the upper 32 bits or the lower 32 bits onto the data lines D[31:0]# 419. In one embodiment, the group of 32 bits placed on data lined D[31:0]# 419 is dependent upon control signals received from bus controller 138, which are in turn dependent upon the data transfer width for the transaction, as discussed in more detail below. Additionally, the upper 32 bits from multiplexor 403 are also placed onto data lines D[63:32]# 418, thereby making the upper 32 bits available on the data bus for 64-bit wide data transfers, according to one embodiment.

Data buffers 406 temporarily store data that is being transferred from another agent to agent 400 via bus 101. According to one embodiment of the present invention each of data buffers 406 comprise four separate buffers each capable of storing 64 bits of data. Buffers 406 and multiplexor 408 are essentially the same as buffers 404 and multiplexors 403 and 405, except that they work in the opposite direction (that is, they operate to store data from the bus rather than transfer data to the bus). Data is received from D[31:0]# lines 419 and possibly D[63:32]# lines 418 and placed into one of data buffers 406 via multiplexor 408. Multiplexor 408 provides either 64 bits of data to a buffer 406 or 32 bits of data as the upper or lower 32 bits to a buffer 406, based on control signals from bus controller 138, which are dependent upon the data transfer widths for the transaction as discussed in more detail below.

Moreover, considering that the data has been transmitted asynchronous to the bus clock, the data will have been received by the agent 400 within a window that crosses a clock cycle boundary. As such, the received data is latched in deskew latches (not shown) within buffers 406 until accessed by the agent 400. Furthermore, the bus controller 138 typically uses the common clock signal to resynchronize the received data with the clock of the agent 400 by determining when the data is to be accessed from the agent 400. A more detailed explanation of one embodiment for performing the resynchronization can be found in the patent application "Source Synchronous Interface Between Master and Slave Using a Deskew Latch", filed on May 6,1997, assigned Ser. No. 08/852,438.

In one embodiment of the present invention, the agents may dynamically change between transferring data via the source synchronous protocol and the common clock protocol. That is, if all agents involved in the bus transaction support source synchronous transfer protocol, then data will be transferred accordingly. Otherwise, data is transferred via the common clock protocol.

For example, in one embodiment of the present invention when agent 400 is issuing a request on the bus, agent 400 provides an indication of the data transfer widths supported by agent 400. In one embodiment this indication is encoded in REQ[4:0]# 414, using REQ[4:3]# asserted in the second clock cycle of the request phase. An encoding of particular data transfer widths supported in this implementation is shown in Table II below, in which "0" indicates an inactive signal and "1" indicates an active signal.

TABLE II

| REQb[4:3]# | Description |
| --- | --- |
| 00 | Supports 64-bit data transfers only. |
| 01 | Supports either 128-bit or 64-bit data transfers. |
| 10 | Supports either 64-bit or 32-bit data transfers. |
| 11 | Supports 32-bit data transfers only. |

The proper indication to be provided by agent 400 is based on the data width indicator 401. In one implementation, data width indicator 401 stores one of the four encoding shown in Table II, and can be placed directly on the bus by bus controller 138. If agent 400 is the target of the request issued by another agent coupled to the bus, then agent 400 also provides, as a target agent, an indication of the data transfer widths supported by agent 400. In one embodiment, this indication is provided using a combination of one or more of DRDY# 426, DRDYS# 428, TRDY# 420, and TRDYS# 422. A summary of the indications provided by these signals, based on what the requesting agent has indicated it supports, as shown in Table III below.

TABLE III

| Data Transfer Widths Supported By Requesting Agent | Type of Request | Signals Provided by Targeted Agent |
| --- | --- | --- |
| 32-bit only | Any | DRDYS# and TRDYS#. DRDY# and TRDY# are not used. |
| 64-bit only | Any | DRDY# and TRDY#. DRDYS# and TRDYS# are not used. |
| 32- or 64-bit | Read | DRDYS# asserted to indicate 32-bit data transfer, DRDY# asserted to indicate 64-bit data transfer. TRDY# and TRDYS# not asserted by targeted agent. |
| 32- or 64-bit | Write | TRDYS# asserted to indicate 32-bit data transfer, TRDY# asserted to indicate 64-bit data transfer. DRDY# and DRDYS# not asserted by targeted agent. |
| 64- or 128-bit | Read | DRDY# asserted to indicate 64-bit data transfer, DRDY# and DRDYS# both asserted to indicate 128-bit data transfer. TRDY# and TRDYS# not asserted by targeted agent. |
| 64- or 128-bit | Write | TRDY# asserted to indicate 64-bit data transfer, TRDY# and TRDYS# both asserted to indicate 128-bit data transfer. DRDY# and DRDYS# not asserted by targeted agent. |

DRDY# 426 and DRDYS# 428 signals also indicate whether a transfer is in accordance with common clock protocol or source synchronous protocol. This is summarized in Table IV below.

TABLE IV

| Data Transfer | DRDY# | DRDYS# | Transfer Protocol |
| --- | --- | --- | --- |
| 32-bit | 0 | 1 | Common Clock |
| 64-bit | 1 | 0 | Common Clock |
| 128-bit | 1 | 1 | Source Synchronous |
| No Transfer | 0 | 0 | No Data Valid |

In embodiments of the present invention in which different agents support up to 32, 64 or 128 bit transfers and which use signals as discussed above in Table III, agents participating in the transaction maintain a record in bus controller 138 of whether the data transfer width indicated as being supported by the requesting agent where 32- or 64-bit, or 64- or 128-bit. For response initiated transactions, a record of DRDY# 426 and DRDYS# 428 is kept. For request initiated transactions or implicit writeback transaction, a record of TRDY# 420 and TRDYS# 422 signals is kept. This record is kept to allow assertion of TRDY# 420 and TRDYS# 422 to indicate either a 64-bit or 128-bit transfer, depending on the original request. A snooping agent monitors TRDY# 420 and TRDYS# 422 signals. If agent 400 snoops a request on the bus which hits a modified cache line in the agent's cache, agent 400, which will be placing writeback data on the bus, indicates the data transfer data width supported by agent 400. In one embodiment, this indication is provided using one or more of the DRDY# 426 and DRDYS# 428 signals. The TRDY# 420 signal and TRDYS# 422 signal are asserted by the targeted agent, as discussed above. A summary of the indications provided by these signals, based on the data transfer widths both the requesting agent and the targeted agent have indicated they support, is shown in Table V below.

TABLE V

| Data Transfer Width Supported By Requesting Agent | Data Transfer Width Supported By Targeted Agent | Request Type | Signals Provided by Snooping Agent |
| --- | --- | --- | --- |
| 32-bit only | Any | Any | DRDYS# used. DRDY# not used. |
| 64-bit only | 64-bit or 128-bit data transfers | Any | DRDY# used. DRDYS# not used. |
| 32-bit or 64-bit data transfers | 32-bit only | Any | DRDYS# used. DRDY# not used. |
| 32-bit or 64-bit data transfers | 32-bit or 64-bit data transfers | Any | DRDYS# asserted, DRDY# deasserted to indicate 32-bit writeback data transfer, DRDY# asserted, DRDYS# deasserted to indicate 64-bit writeback transfer. |
| 64-bit or 128-bit data transfers | 64-bit only | Any | DRDY# used. DRDYS# not used. |
| 64-bit or 128-bit data transfers | 64-bit or 128-bit data transfers | Any | DRDY# asserted to indicate 64-bit writeback data transfer, DRDY# and DRDYS# both asserted to indicate 128-bit writeback transfer. |

Figure 6:
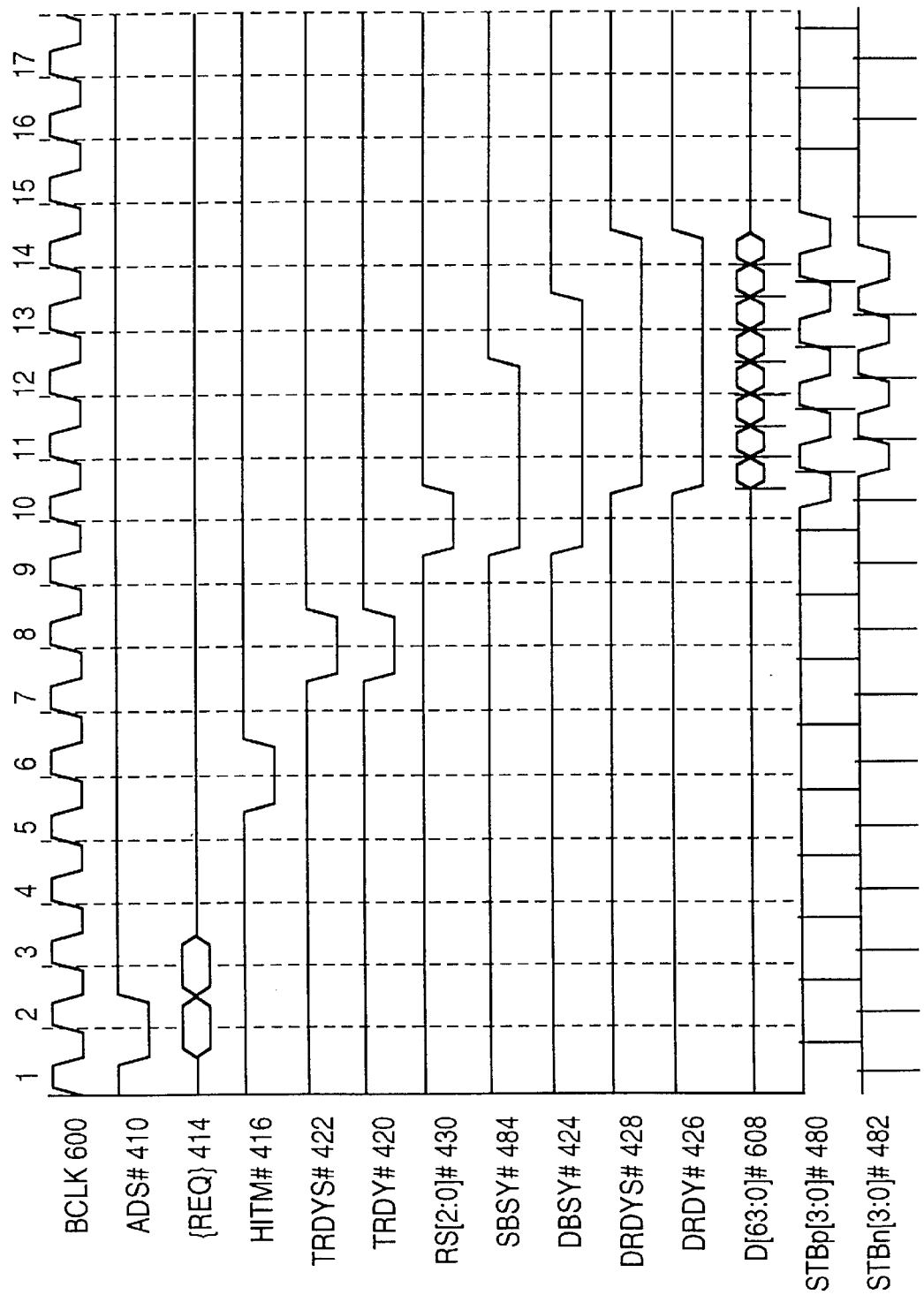
FIG. 6 is a timing diagram illustrating a read 64-byte transaction with implicit write back using source synchronous transfer according to an embodiment of the present invention.

FIG. 6 is a timing diagram showing the events of a 64-byte read transaction with implicit writeback according to source synchronous protocol. In this embodiment, the data bus is 64 bits wide, so the transaction requires the transmission of eight separate chunks of 64 bits each.

In the example of FIG. 6, the requesting agent asserts ADS# 410 in T1 to initiate a 64-byte read transaction. In T2, the requesting agent asserts certain bits of request signals {REQ} 414 to indicate a 64-byte length and that it is a 64-bit/128-bit agent. During the snoop phase in T5, HITM# 416 is asserted by the snooping agent. In T7 the responding agent asserts TRDYS# 422 and TRDY# 420 to indicate that it is ready to accept writeback data and that it is capable of performing 128-bit data transactions in a source synchronous mode. Because the responding, or target agent is responsible for driving the appropriate TRDY#/TRDYS# signals based on the original request received, the snooping agent is relieved of this burden. In T8, the snooping agent samples TRDYS# 422 and TRDY# 420 asserted with deasserted DBSY# 424. In T9, the snooping agent begins the data phase by asserting DBSY# 424 and SBSY# 484. The snooping agent predrives STBp[3:0]# 480 at the 75% point of T9.

The snooping agent begins valid data transfer by asserting DRDYS# 428 and DRDY# 426 and driving valid data on D[63:0]# 608 on the rising edge and at the 50% point of BCLK 600 between T10 and T13. Two 64-bit chunks of data are driven onto the bus in one clock period of BCLK 600. The snooping agent drives a rising and falling edge on both STBp[3:0]# 480 and STBn[3:0]# 482 at the 25% and 75% point of BCLK 600 between T10 and T13 (the center of each data transfer). The snooping agent drives a rising edge on STBp[3:0]# 480 and at the 25% point of T14 to turn the bus over to the next agent.

About one clock cycle after the snooping agent drives the strobes, the centered strobes arrive at the requesting and responding agents to capture the data. With each arriving strobe pair a new chunk of data is captured into the requested and responding agents' buffers. In T11, the requesting and responding agents sample DRDYS# 428 and DRDY# 426 and know that data has been sent. Sometime later, the requesting agent and the responding agent latch the data into the BCLK 600 domain. Thus, FIG. 6 illustrates bus agents sending 128 bits of data in one clock period of a 64-bit bus using source synchronous protocol.

In the foregoing specification, the invention has been described with reference to specific exemplary embodiments thereof. For example, the present invention has been described with reference to particular system configurations, signal encodings, and data transmission widths. Various modifications and changes may be made to such specific details as described herein, without departing from the broader spirit and scope of the invention as set forth in the following claims.

What is claimed is:

1. A method for transferring data between bus agents in a computer system, comprising:

transmitting a control signal, from a first agent to a second agent, via a first transfer protocol that is clocked by a bus clock of the computer system; and transmitting data corresponding to said control signal, from said first agent to said second agent, via a second transfer protocol, the second transfer protocol enabling the second agent to sample the data asynchronous to the bus clock, the data being synchronized to a plurality of strobe signals, each of the strobe signals being on a separate strobe line, each strobe signal latches separate data chunks.

2. The method of claim 1, wherein the first transfer protocol is a synchronous transmission with respect to the bus clock.

3. The method of claim 2, wherein the control signal has a first data width, and the data has a second and different data width.

4. The method of claim 3, wherein the second data width is greater than the first data width.

5. The method of claim 2, wherein the first transfer protocol comprises a common clock data transfer protocol; and the second transfer protocol comprises a source clock data transfer protocol.

6. The method of claim 2, wherein said transmitting data corresponding to said control signal comprises:

transmitting at least one strobe corresponding to each of a plurality of data chunks comprising the data transmission; and using a strobe to latch a data chunk into a buffer of an agent receiving the data transmission.

7. The method of claim 6, wherein strobes corresponding to data chunks are transmitted at a rate that is twice the rate of the bus clock.

8. The method of claim 6, wherein a data chunk is as wide as a data bus of the computer system.

9. The method of claim 6, wherein the control signal comprises 128 bits, and wherein the data corresponding to said control signal comprises transmission of 128 bits in one cycle of the bus clock.

10. The method of claim 6, wherein the control signal comprises 256 bits, and wherein the data corresponding to said control signal comprises transmission of 256 bits in one cycle of the bus clock.

11. The method of claim 10, wherein the bus is 64 bits wide.

12. An apparatus for transferring data between bus agents in a computer system, said apparatus comprising:

a bus operable to transmit a control signal, from a first agent to a second agent, via a first transfer protocol that is clocked by a bus clock of the computer system;

said bus further operable to transmit data corresponding to said control signal, from said first agent to said second agent, via a second transfer protocol, said second transfer protocol enabling the second agent to sample the data asynchronous to the bus clock, the data being synchronized to a plurality of strobe signals, each of the plurality of strobe signals being on a separate strobe line, each strobe signal latches separate data chunks.

13. The apparatus of claim 12, wherein the control signal transmission has a first data width, and the data transmission has a second and different data width.

14. The apparatus of claim 13, wherein the second data width of the data transmission is greater than the first data width of the control signal transmission.

15. The apparatus of claim 12, wherein the control signal transmission is according to a common clock data transfer protocol and the data transmission is according to a source clock data transfer protocol.

16. The apparatus of claim 12, wherein to transmit data synchronously, said bus is further operable to transmit at least one strobe corresponding to each of a plurality of data chunks comprising the data transmission, and use said strobe to latch a data chunk into a buffer of an agent receiving the data transmission.

17. The apparatus of claim 16, wherein strobes corresponding to data chunks are transmitted at a rate that is twice the bus clock rate.

18. The apparatus of claim 16, wherein a data chunk is as wide as a data bus of the computer system.

19. The apparatus of claim 16, wherein the control signal transmission comprises 128 bits, and wherein the data transmission comprises transmission of 128 bits in one cycle of the bus clock.

20. The apparatus of claim 16, wherein the control signal transmission comprises 256 bits, and wherein the data transmission comprises transmission of 256 bits in one cycle of the bus clock.

21. The apparatus of claim 20, wherein the bus is 64 bits wide.

22. A method comprising:

transmitting one or more control signals from a first bus agent of a plurality of bus agents to a second bus agent of the plurality of bus agents according to a common clock protocol based upon a bus clock;

transmitting data corresponding to the one or more control signals from the first bus agent to the second bus agent according to a source-synchronous data transmission protocol that allows the second bus agent to sample the data asynchronous to the bus clock, the data being synchronized to a plurality of strobe signals, each of the plurality of strobe signals being on a separate strobe line, each strobe signal latches separate data chunks.

23. The method of claim 22, wherein the first bus agent comprises a processor.

24. The method of claim 23, wherein the bus clock is used for transferring the one or more control signals over a processor-memory bus, and wherein the second bus agent comprises a memory device.

25. A method comprising:

transmitting a control signal indicative of a phase of a bus transaction from a first bus agent to a second bus agent according to a first transmission protocol that is clocked by a bus clock; and transmitting data associated with the bus transaction from the first bus agent to the second bus agent according to a second transaction protocol that includes a plurality strobe signals, each of the plurality of strobe signals being on a separate strobe line, the plurality of strobe signals enabling the second bus agent to sample data with the one or more independent strobe signals asynchronous to the bus clock.

26. The method of claim 25, wherein the phase comprises an arbitration phase, a request phase, an error phase, a snoop phase, or a response phase.

27. A method comprising:

transmitting a control signal from a first agent of a computer system to a second agent of the computer system via a first transfer protocol that is clocked at a first rate, wherein the first rate is the rate of bus clock of the computer system; and transmitting data corresponding to the control signal from the first agent to the second agent via a second transfer protocol that is clocked at a second rate, wherein the second rate is determined by the control signal, the data being synchronized to a plurality of strobe signals, each of the plurality of strobe signals being on a separate strobe line, each strobe signal latches separate data chunks.

28. The method of claim 27, wherein the second rate is chosen from either the first rate or a second rate that is faster than the first rate.

29. The method of claim 28, wherein the second rate is a rate that is twice the first rate.

30. The method of claim 27, wherein transmitting data via the second transfer protocol comprises: transmitting the plurality of strobe signals; and latching a data chunk based upon each of the plurality of strobe signals.

31. The method of claim 30, further comprising transmitting two strobe signals and latching a data chunk at the leading edge of each of the two strobe signals.

32. The method of claim 31, wherein:

a first data chunk is transmitted at a point that is approximately at the beginning of a bus clock cycle;

a second data chunk is transmitted at a point that is approximately 50 percent through the bus clock cycle; and the two strobe signals are comprised of a first strobe signal and a second strobe signal, wherein:

the first strobe signal is transmitted at a point when the leading edge of the strobe is at a point that is approximately 25 percent through the bus clock cycle, and the second strobe signal is transmitted at a point when the leading edge of the strobe is at a point that is approximately 75 percent through the bus clock cycle.

33. A method comprising:

transmitting a control signal from a first agent of a computer system to a second agent of the computer system at the rate of a bus clock of the computer system;

transmitting data that corresponds to the control signal from the first agent to the second agent at a second rate that is chosen by the control signal, wherein the second rate is either the rate of the bus clock or is a rate that is twice the rate of the bus clock; and if the control signal chooses the rate of twice the bus clock:

transmitting a first strobe on a first strobe line and a second strobe on a second strobe line, latching a first data chunk based upon the timing of the first strobe, and latching a second data chunk based upon the timing of the second strobe.

34. The method of claim 33, wherein:

a first data chunk is transmitted at a time that is approximately at the beginning of a bus clock cycle; and a second data chunk is transmitted at a time that is approximately 50 percent through the bus clock cycle.

35. The method of claim 34, wherein the first data chunk is latched when the leading edge of the first strobe occurs and the second data chunk is latched when the leading edge of the second strobe occurs.

36. The method of claim 35, wherein:

the first strobe is transmitted at a time that is approximately 25 percent through the bus clock cycle, and the second strobe is transmitted at a time that is approximately 75 percent through the bus clock cycle.

37. A computer system comprising:

a bus;

a bus clock;

a first agent and a second agent connected to the bus, wherein:

the first agent transmits a control signal to the second agent at a rate of the bus clock, and the first agent transmits a data signal to the second agent at a rate that is determined by the control signal, the data signal being synchronized with a plurality of strobe signals, each of the plurality of strobe signals being on a separate strobe line, each strobe signal latches separate data chunks.

38. The computer system of claim 37, wherein the rate determined by the control signal is chosen from either the rate of the bus clock or a rate that is faster than the bus clock.

39. The computer system of claim 38, wherein the rate that is faster than the bus clock is twice the rate of the bus clock.

40. The computer system of claim 39, wherein the first agent transmits at least one strobe and wherein the computer system latches a data chunk based upon the strobe.

41. The computer system of claim 39, wherein the first agent transmits a first strobe and a second strobe.

42. The computer system of claim 41, wherein the computer system latches a first data chunk at the leading edge of the first strobe and latches a second data chunk at the leading edge of the second strobe.

43. The computer system of claim 42, wherein:

the first data chunk is transmitted at a point that is approximately at the beginning of a bus clock cycle;

the second data chunk is transmitted at a point that is approximately 50 percent through the bus clock cycle;

the first strobe is transmitted at a point that is approximately 25 percent through the bus clock cycle, and the second strobe is transmitted at a point that is approximately 75 percent through the bus clock cycle.

44. An apparatus comprising:

a bus controller to transmit a first set of signals synchronized to a bus clock using a common clock protocol at a common clock frequency; and the bus controller to transmit a second set of signals using a source synchronous protocol, the second set of signals being synchronized to a plurality of strobe signals, each of the plurality of strobe signals being on a separate strobe line, each strobe signal latches separate data chunks, the second set of signals being transmitted with an offset to the plurality of strobe signals, the second set of signals being transmitted with a timing relationship to the bus clock, and wherein the second set of signals is transmitted at a multiple of the common clock frequency.

45. The apparatus of claim 44, wherein the multiple is two and the timing relationship is that the plurality of strobes are aligned to provide strobe transitions at a twenty-five percent point and a seventy-five percent point of a bus clock cycle of the bus clock signal and the bus controller transmits the second set of signals at a rising edge of the bus clock cycle and at a fifty percent point of the bus clock cycle.

46. The apparatus of claim 44, wherein the second set of signals is part of a multi-phase bus transaction associated with one or more of the signals of the first set of signals.

47. The apparatus of claim 44, wherein the plurality of strobe signals comprises one or more pairs of strobe signals having complementary waveforms.

48. The apparatus of claim 44, wherein the plurality of strobe signals comprises one or more pairs of strobe signals, each of the one or more pairs or strobe signals having a first strobe signal on a first strobe line and a second strobe signal on a second strobe line, the first strobe signal and the second strobe signal having substantially aligned transitions.

49. The apparatus of claim 44, wherein at least one signal transmitted using the common clock protocol signals transmission of valid information via the second set of signals using the source synchronous protocol.

50. The apparatus of claim 49, wherein the at least one signal transmitted using the common clock protocol to signal transmission of the valid information is transmitted during a phase in which the valid information is also transmitted.

51. The apparatus of claim 44, wherein a data ready signal is sent synchronous to the bus clock to indicate transmission of valid data using the source synchronous protocol.

52. The apparatus of claim 44, wherein each N bits of information transmitted via the second set of signals are transmitted with a pair of the plurality of strobe signals.

53. The apparatus of claim 44, wherein the first set of signals comprises control signals for several of a plurality of phases of a bus transaction, and wherein the second set of signals is communicated during one phase of the plurality of phases of the bus transaction.

54. The apparatus of claim 44, wherein the apparatus is a memory controller component.

55. The apparatus of claim 44, wherein the apparatus is a processor.

56. An apparatus comprising:
a bus controller to transmit a plurality of control signals synchronized to a bus clock using a common clock protocol at a common clock frequency, the plurality of control signals being communicated during a plurality of phases of a bus transaction;
the bus controller to transmit a second set of signals using a source synchronous protocol, the second set of signals being synchronized to a plurality of strobe signals, each of the plurality of strobe signals being on a separate strobe line, the second set of signals being transmitted during only a subset of the plurality of phases of the bus transaction, the second set of signals being transmitted at twice the common clock frequency, and the plurality of strobe signals being aligned to provide strobe transitions at substantially a twenty-five percent point and substantially a seventy-five percent point of a bus clock cycle of the bus clock, and the bus controller transmitting the second set of signals at substantially a rising edge of the bus clock cycle and at substantially a fifty percent point of the bus clock cycle; and
the plurality of control signals including at least one control signal to signal transmission of valid information via the second set of signals.

57. The apparatus of claim 56, wherein the plurality of strobe signals comprises one or more pairs of strobe signals, each of the one or more pairs of strobe signals having a first strobe signal on a first strobe line and a second strobe signal on a second strobe line, the first strobe signal and the second strobe signal having substantially aligned transitions, and wherein each N bits of information transmitted via the second set of signals are transmitted with a pair of the plurality of strobe signals.

58. The apparatus of claim 56, wherein the plurality of phases of the bus transaction in which the control signals are asserted comprise a subset of a total plurality of phases of the bus transaction.

59. The apparatus of claim 56, wherein the apparatus is a memory controller component.

60. The apparatus of claim 56, wherein the apparatus is a processor.

61. An apparatus comprising:
a bus controller to transmit a plurality of control signals synchronized to a bus clock using a common clock protocol at a common clock frequency, the plurality of control signals being communicated during a plurality of phases of a bus transaction;
the bus controller to transmit a second set of signals using a source synchronous protocol, the second set of signals being synchronized to a plurality of strobe signals, each of the plurality of strobe signals being on a separate strobe line, each strobe signal latches a separate data chunks, the second set of signals being transmitted during only a subset of the plurality of phases of the bus transaction, the second set of signals being transmitted at a multiple of the common clock frequency;
the plurality of control signals including at least one control signal transmitted via the common clock protocol to signal transmission of valid information using the source synchronous protocol, the at least one control signal transmitted using the common clock protocol to signal transmission of the valid information being transmitted during a phase in which the valid information is also transmitted.

62. The apparatus of claim 61, wherein the plurality of strobe signals are aligned to provide strobe transitions at predetermined offsets from transitions of the second set of signals, and the bus controller transitioning the second set of signals to new values at predetermined points in a bus clock cycle of the bus clock.

63. The apparatus of claim 62, wherein the plurality of strobe signals comprises one or more pairs of strobe signals, each of the one or more pairs of strobe signals having a first strobe signal on a first strobe line and a second strobe signal on a second strobe line, the first strobe signal and the second strobe signal having substantially aligned transitions, and wherein each N bits of information transmitted via the second set of signals are transmitted with a pair of the plurality of strobe signals.

64. The apparatus of claim 63, wherein the plurality of phases of the bus transaction in which the control signals are asserted comprise a subset of a total plurality of phases of the bus transaction.

65. The apparatus of claim 64, wherein the apparatus is a memory controller component.

66. The apparatus of claim 64, wherein the apparatus is a processor.

67. An apparatus comprising:
a bus controller to transmit a first set of signals synchronized to a bus clock using a common clock protocol at a common clock frequency, the first set of signals comprising a plurality of control signals on a plurality of strobe lines communicated during a plurality of phases of a bus transaction;

the bus controller to transmit a second set of signals using a source synchronous protocol, the second set of signals being synchronized to the plurality of strobe signals, each of the plurality of strobe signals being on a separate strobe line, each strobe signal latches a separate N elements, the second set of signals being transmitted during only a subset of the plurality of phases of the bus transaction, the second set of signals being transmitted at a multiple N of the common clock frequency, the second set of signals having N elements transmitted in a signal transfer time period that is equivalent to one clock cycle of the common clock frequency, and the plurality of strobe signals being aligned to provide strobe transitions at substantially a center point of each of the N elements.

68. The apparatus of claim 67, wherein the signal transfer time period is synchronized to the bus clock.

69. The apparatus of claim 68, wherein a first element is transmitted via the second set of signals at a beginning of the signal transfer time period and a second element is transmitted via the second set of signals at a fifty percent point in the signal transfer time period, and further wherein a first strobe signal of the plurality of strobe signals transitions at a twenty-five percent point in the signal transfer time period and a second strobe signal of the plurality of strobe signals transitions at a seventy-five percent point in the signal transfer time period.

70. The apparatus of claim 69, wherein the plurality of control signals include at least one control signal to signal transmission of valid information using the source synchronous protocol.

71. The apparatus of claim 70, wherein the at least one signal transmitted using the common clock protocol to signal transmission of the valid information is transmitted during a phase in which the valid information is also transmitted.

72. An apparatus comprising:

a bus controller to transmit a first set of signals synchronized to a bus clock using a common clock protocol at a common clock frequency, the first set of signals comprising a plurality of control signals communicated during a plurality of phases of a bus transaction;

the bus controller to transmit a second set of signals using a source synchronous protocol, the second set of signals being synchronized to a plurality of strobe signals, each of the plurality of strobe signals being on a separate strobe line, the second set of signals being transmitted during only a subset of the plurality of phases of the bus transaction, the second set of signals being transmitted at twice the common clock frequency, the second set of signals having two elements transmitted in a signal transfer time period that is equivalent to one clock cycle of the common clock frequency, a first element being transmitted via the second set of signals at substantially a beginning of the signal transfer time period and a second element being transmitted via the second set of signals at substantially a fifty percent point in the signal transfer time period, and a first strobe signal of the plurality of strobe signals transitioning at substantially a twenty-five percent point in the signal transfer time period and a second strobe signal of the plurality of strobe signals transitioning at substantially a seventy-five percent point in the signal transfer time period;

the plurality of control signals including at least one control signal to signal transmission of valid information via the second set of signals.

73. The apparatus of claim 72, wherein the at least one signal transmitted using the common clock protocol to signal transmission of the valid information is transmitted during a phase in which the valid information is also transmitted.

74. The apparatus of claim 72, wherein the plurality of strobe signals comprises one or more pairs of strobe signals, each of the one or more pairs of strobe signals having a first strobe signal on a first strobe line and a second strobe signal on a second strobe line, the first strobe signal and the second strobe signal having substantially aligned transitions, and wherein each N bits of information transmitted via the second set of signals are transmitted with a pair of the plurality of strobe signals.

75. The apparatus of claim 73, wherein the plurality of phases of the bus transaction in which the control signals are asserted comprise a subset of a total plurality of phases of the bus transaction.

76. The apparatus of claim 73, wherein the apparatus is a memory controller component.

77. The apparatus of claim 73, wherein the apparatus is a processor.

78. A method comprising:

transmitting via a bus controller a first set of signals synchronized to a bus clock using a common clock protocol at a common clock frequency;

transmitting via the bus controller a second set of signals using a source synchronous protocol, the second set of signals being synchronized to a plurality of strobe signals, each of the plurality of strobe signals being on a separate strobe line, the second set of signals being transmitted with an offset to the plurality of strobe signals, the second set of signals being transmitted with a timing relationship to the bus clock, and wherein the second set of signals is transmitted at a multiple of the common clock frequency wherein the plurality of strobe signals comprises one or more pairs of strobe signals having complementary waveforms.

79. The method of claim 78, wherein the multiple is two and the timing relationship is that the plurality of strobes are aligned to provide strobe transitions at a twenty-five percent point and a seventy-five percent point of a bus clock cycle of the bus clock signal and the bus controller transmits the second set of signals at a rising edge of the bus clock cycle and at a fifty percent point of the bus clock cycle.

80. The apparatus of claim 78, wherein the second set of signals is part of a multi-phase bus transaction associated with one or more of the signals of the first set of signals.

81. The method of claim 78, wherein the plurality of strobe signals comprises one or more pairs of strobe signals, each of the one or more pairs of strobe signals having a first strobe signal on a first strobe line and a second strobe signal on a second strobe line, the first strobe signal and the second strobe signal having substantially aligned transitions.

82. The method of claim 78, wherein the second set of signals comprises address signals and wherein at least one signal of the first set of signals transmitted using the common clock protocol signals transmission of a valid address via the address signals using the source synchronous protocol.

83. The method of claim 82, wherein the at least one signal transmitted using the common clock protocol to signal transmission of a valid address is transmitted during a phase in which the valid address is also transmitted.

84. The method of claim 78, wherein the second set of signals comprises data signals and wherein a data ready signal is sent synchronous to the bus clock to indicate transmission of valid data using the source synchronous protocol.

85. The method of claim 78, wherein the plurality of strobe signals comprises one or more pairs of strobe signals, and wherein each N bits of information transmitted via the second set of signals are transmitted with one of the pairs of strobe signals.

86. The method of claim 78, wherein the first set of signals comprises a plurality of control signals for several of a plurality of phases of a bus transaction, and wherein the second set of signals is communicated during a single phase of the bus transaction using the source synchronous protocol.

87. A method comprising:
transmitting via a control bus coupled with a bus controller a first set of signals synchronized to a bus clock using a common clock protocol at a common clock frequency, the first set of signals comprising a plurality of control signals employed during a plurality of phases of a bus transaction; and
transmitting via a data bus coupled with the bus controller a set of data signals using a source synchronous protocol, the set of data signals being synchronized to a plurality of strobe signals, each of the plurality of strobe signals being on a separate strobe line, the set of data signals being transmitted during only a subset of the plurality of phases of the bus transaction, the set of data signals being transmitted at twice the common clock frequency, and the plurality of strobe signals being aligned to provide strobe transitions at substantially a twenty-five percent point and substantially a seventy-five percent point of a bus clock cycle of the bus clock, and the bus controller transmitting the second set of signals at substantially a rising edge of the bus clock cycle and at substantially a fifty percent point of the bus clock cycle; and
the plurality of control signals including at least one control signal transmitted via the common clock protocol to a target coupled with the control bus and the data bus to signal transmission of valid information using the source synchronous protocol.

88. The method of claim 87, wherein the plurality of strobe signals comprises one or more pairs of strobe signals, each of the one or more pairs of strobe signals having a first strobe signal on a first strobe line and a second strobe signal on a second strobe line, the first strobe signal and the second strobe signal having substantially aligned transitions.

89. The method of claim 88, wherein each N bits of data transmitted via the set of data signals are transmitted with a pair of the plurality of strobe signals.

90. The method of claim 87, wherein the plurality of phases of the bus transaction in which the control signals are asserted comprise a subset of a total plurality of phases of the bus transaction.

91. A method comprising:
transmitting via a bus controller a first set of signals synchronized to a bus clock using a common clock protocol at a common clock frequency, the first set of signals comprising a plurality of control signals communicated during a plurality of phases of a bus transaction;
transmitting via the bus controller a second set of signals using a source synchronous protocol, the second set of signals being synchronized to a plurality of strobe signals, each of the plurality of strobe signals being on a separate strobe line, each strobe signal latches separate data chunks, the second set of signals being transmitted during only a subset of the plurality of phases of the bus transaction, the second set of signals being transmitted at a multiple of the common clock frequency;
the plurality of control signals including at least one control signal transmitted via the common clock protocol to signal transmission of valid information using the source synchronous protocol, the at least one control signal transmitted using the common clock protocol to signal transmission of the valid information being transmitted during a phase in which the valid information is also transmitted.

92. The method of claim 91, wherein the plurality of strobe signals are aligned to provide strobe transitions at predetermined offsets from transitions of the second set of signals, and the bus controller transitioning the second set of signals to new values at predetermined points in a bus clock cycle of the bus clock.

93. The method of claim 91, wherein the plurality of strobe signals comprises one or more pairs of strobe signals, each of the one or more pairs of strobe signals having a first strobe signal on a first strobe line and a second strobe signal on a second strobe line, the first strobe signal and the second strobe signal having substantially aligned transitions, and wherein each N bits of information transmitted via the second set of signals are transmitted with a pair of the plurality of strobe signals.

94. The method of claim 91, wherein the plurality of phases of the bus transaction in which the control signals are asserted comprise a subset of a total plurality of phases of the bus transaction.

95. A method comprising:
transmitting via a bus controller a first set of signals synchronized to a bus clock using a common clock protocol at a common clock frequency, the first set of signals comprising a plurality of control signals communicated during a plurality of phases of a bus transaction;
transmitting via the bus controller a second set of signals using a source synchronous protocol, the second set of signals being synchronized to a plurality of strobe signals, each of the plurality of strobe signals being on a separate strobe line, each strobe signal latches a separate N elements, the second set of signals being transmitted during only a subset of the plurality of phases of the bus transaction, the second set of signals being transmitted at a multiple N of the common clock frequency, the second set of signals having N elements transmitted in a signal transfer time period that is equivalent to one clock cycle of the bus clock, and the plurality of strobe signals being aligned to provide strobe transitions at substantially a center point of each of the N elements.

96. The method of claim 95, wherein the signal transfer time period is synchronized to the bus clock.

97. The method of claim 96, wherein a first element is transmitted via the second set of signals at a beginning of the signal transfer time period and a second element is transmitted via the second set of signals at a fifty percent point in the signal transfer time period, and further wherein a first strobe signal of the plurality of strobe signals transitions at a twenty-five percent point in the signal transfer time period and a second strobe signal of the plurality of strobe signals transitions at a seventy-five percent point in the signal transfer time period.

98. The method of claim 97, wherein the plurality of control signals including at least one control signal transmitted via the common clock protocol to signal transmission of valid information using the source synchronous protocol.

99. The method of claim 98, wherein the at least one signal transmitted using the common clock protocol to signal transmission of the valid information is transmitted during a phase in which the valid information is also transmitted.

100. A method comprising:
transmitting via a bus controller a first set of signals synchronized to a bus clock using a common clock protocol at a common clock frequency, the first set of signals comprising a plurality of control signals communicated during a plurality of phases of a bus transaction;
transmitting via the bus controller a second set of signals using a source synchronous protocol, the second set of signals being synchronized to a plurality of strobe signals, each of the plurality of strobe signals being on a separate strobe line, the second set of signals being transmitted during only a subset of the plurality of phases of the bus transaction, the second set of signals being transmitted at twice the common clock frequency, the second set of signals having two elements transmitted in a signal transfer time period that is equivalent to one clock cycle of the bus clock, a first element being transmitted via the second set of signals at substantially a beginning of the signal transfer time period and a second element being transmitted via the second set of signals at substantially a fifty percent point in the signal transfer time period, and the plurality of strobe signals being aligned to transition at substantially a twenty-five percent point in the signal transfer time period and at substantially a seventy-five percent point in the signal transfer time period;
wherein the plurality of control signals including at least one control signal transmitted via the common clock protocol to signal transmission of valid information using the source synchronous protocol.

101. The method of claim 100, wherein the at least one signal transmitted using the common clock protocol to signal transmission of the valid information is transmitted during a phase in which the valid information is also transmitted.

102. The method of claim 100, wherein the plurality of strobe signals comprises one or more pairs of strobe signals, each of the one or more pairs of strobe signals having a first strobe signal on a first strobe line and a second strobe signal on a second strobe line, the first strobe signal and the second strobe signal having substantially aligned transitions, and wherein each N bits of the second set of signals are transmitted with a pair of the plurality of strobe signals.

103. The method of claim 100, wherein the plurality of phases of the bus transaction in which the control signals are asserted comprise a subset of a total plurality of phases of the bus transaction.

104. A computer system comprising:
a bus;
a bus clock;
a processor coupled with the bus, the processor including a bus controller;
the bus controller to transmit a first set of signals synchronized to the bus clock using a common clock protocol at a common clock frequency;
the bus controller to transmit a second set of signals using a source synchronous protocol, the second set of signals being synchronized to a plurality of strobe signals, each of the plurality of strobe signals being on a separate strobe line, the second set of signals being transmitted with an offset to the plurality of strobe signals, the second set of signals being transmitted with a timing relationship to the bus clock, and wherein the second set of signals is transmitted at a multiple of the common clock frequency wherein the plurality of strobe signals comprises one or more pairs of strobe signals having complementary waveforms.

105. The computer system of claim 104, wherein the multiple is two and the timing relationship is that the plurality of strobes are aligned to provide strobe transitions at a twenty-five percent point and a seventy-five percent point of a bus clock cycle of the bus clock signal and the bus controller transmits the second set of signals at a rising edge of the bus clock cycle and at a fifty percent point of the bus clock cycle.

106. The computer system of claim 104, wherein the second set of signals is part of a multi-phase bus transaction associated with one or more of the signals of the first set of signals.

107. The computer system of claim 104, wherein the plurality of strobe signals comprises one or more pairs of strobe signals, each of the one or more pairs of strobe signals having a first strobe signal on a first strobe line and a second strobe signal on a second strobe line, the first strobe signal and the second strobe signal having substantially aligned transitions.

108. The computer system of claim 104, wherein at least one signal transmitted using the common clock protocol signals transmission of valid information via the second set of signals using the source synchronous protocol.

109. The computer system of claim 108, wherein the at least one signal transmitted using the common clock protocol to signal transmission of the valid information is transmitted during a phase in which the valid information is also transmitted.

110. The computer system of claim 104, wherein a data ready signal is sent synchronous to the bus clock to indicate transmission of valid data using the source synchronous protocol.

111. The computer system of claim 104, wherein each N bits of information transmitted via the second set of signals are transmitted with a pair of the plurality of strobe signals.

112. The computer system of claim 104, wherein the first set of signals comprises a plurality of control signals for several of a plurality of phases of a bus transaction, and wherein the second set of signals is communicated during only one phase of the bus transaction.

113. A computer system comprising:
a bus;
a bus clock;
a processor coupled with the bus, the processor including a bus controller;
the bus controller to transmit a first set of signals synchronized to a bus clock using a common clock protocol at a common clock frequency, the first set of signals comprising a plurality of control signals communicated during a plurality of phases of a bus transaction;
the bus controller to transmit a second set of signals using a source synchronous protocol, the second set of signals being synchronized to a plurality of strobe signals, each of the plurality of strobe signals being on a separate strobe line, the second set of signals being transmitted during only a subset of the plurality of phases of the bus transaction, the second set of signals being transmitted at twice the common clock frequency, and the plurality of strobe signals being aligned to provide strobe transitions at substantially a twenty-five percent point and substantially a seventy-five percent point of a bus clock cycle of the bus clock, and the bus controller transmitting the second set of signals at substantially a rising edge of the bus clock cycle and at substantially a fifty percent point of the bus clock cycle; and the plurality of control signals including at least one control signal transmitted via the common clock protocol to signal transmission of valid information has been transmitted using the source synchronous protocol.

114. The computer system of claim 113, wherein the plurality of strobe signals comprises one or more pairs of strobe signals, each pair of the one or more pairs of strobe signals having a first strobe signal on a first strobe line and a second strobe signal on a second strobe line, the first strobe signal and the second strobe signal having substantially aligned transitions, and wherein each N bits of the second set of signals are transmitted with a pair of the plurality of strobe signals.

115. The computer system of claim 113, wherein the plurality of phases of the bus transaction in which the control signals are asserted comprise a subset of a total plurality of phases of the bus transaction.

116. A computer system comprising:

a bus;

a bus clock;

a processor coupled with the bus, the processor including a bus controller;

the bus controller to transmit a first set of signals synchronized to a bus clock using a common clock protocol at a common clock frequency, the first set of signals comprising a plurality of control signals communicated during a plurality of phases of a bus transaction;

the bus controller to transmit a second set of signals using a source synchronous protocol, the second set of signals being synchronized to a plurality of strobe signals, each of the plurality of strobe signals being on a separate strobe line, each strobe signal latches separate data chunks, the second set of signals being transmitted during only a subset of the plurality of phases of the bus transaction, the second set of signals being transmitted at a multiple of the common clock frequency;

the plurality of control signals including at least one control signal transmitted via the common clock protocol to signal transmission of valid information using the source synchronous protocol, the at least one control signal transmitted using the common clock protocol to signal transmission of the valid information being transmitted during a phase in which the valid information is also transmitted.

117. The computer system of claim 116, wherein the plurality of strobe signals are aligned to provide strobe transitions at predetermined offsets from transitions of the second set of signals, and the bus controller transitioning the second set of signals to new values at predetermined points in a bus clock cycle of the bus clock.

118. The computer system of claim 117, wherein the plurality of strobe signals comprises one or more pairs of strobe signals, each pair of the one or more pairs of strobe signals having a first strobe signal on a first strobe line and a second strobe signal on a second strobe line, the first strobe signal and the second strobe signal having substantially aligned transitions, and wherein each N bits of the second set of signals are transmitted with a pair of the plurality of strobe signals.

119. The computer system of claim 118, wherein the plurality of phases of the bus transaction in which the control signals are asserted comprise a subset of a total plurality of phases of the bus transaction.

120. A computer system comprising:

a bus;

a bus clock;

a processor coupled with the bus, the processor including a bus controller;

the bus controller to transmit a first set of signals synchronized to the bus clock using a common clock protocol at a common clock frequency, the first set of signals comprising a plurality of control signals communicated during a plurality of phases of a bus transaction;

the bus controller to transmit a second set of signals using a source synchronous protocol, the second set of signals being synchronized to a plurality of strobe signals, each of the plurality of strobe signals being on a separate strobe line, each strobe signal latches a separate N elements, the second set of signals being transmitted during only a subset of the plurality of phases of the bus transaction, the second set of signals being transmitted at a multiple N of the common clock frequency, the second set of signals having N elements transmitted in a signal transfer time period that is equivalent to one clock cycle of the bus clock, and the plurality of strobe signals being aligned to provide strobe transitions at substantially a center point of each of the N elements.

121. The computer system of claim 120, wherein the signal transfer time period is synchronized to the bus clock.

122. The computer system of claim 121, wherein a first element is transmitted via the second set of signals at a beginning of the signal transfer time period and a second element is transmitted via the second set of signals at a fifty percent point in the signal transfer time period, and further wherein a first strobe signal of the plurality of strobe signals transitions at a twenty-five percent point in the signal transfer time period and a second strobe signal of the plurality of strobe signals transitions at a seventy-five percent point in the signal transfer time period.

123. The computer system of claim 122, wherein the plurality of control signals includes at least one control signal transmitted via the common clock protocol to signal transmission of valid information using the source synchronous protocol.

124. The computer system of claim 123, wherein the at least one signal transmitted using the common clock protocol to signal transmission of the valid information is transmitted during a phase in which the valid information is also transmitted.

125. A computer system comprising:

a bus;

a bus clock;

a processor coupled with the bus, the processor including a bus controller;

a bus controller to transmit a first set of signals synchronized to the bus clock using a common clock protocol at a common clock frequency, the first set of signals comprising a plurality of control signals communicated during a plurality of phases of a bus transaction;

the bus controller to transmit a second set of signals using a source synchronous protocol, the second set of signals being synchronized to a plurality of strobe signals, each of the plurality of strobe signals being on a separate strobe line, the second set of signals being transmitted during only a subset of the plurality of phases of the bus transaction, the second set of signals being transmitted at twice the common clock frequency, the second set of signals having two elements transmitted in a signal transfer time period that is equivalent to one clock cycle of the bus clock, a first element being transmitted via the second set of signals at substantially a beginning of the signal transfer time period and a second element being transmitted via the second set of signals at substantially a fifty percent point in the signal transfer time period, and a first strobe signal of the plurality of strobe signals transitioning at substantially a twenty-five percent point in the signal transfer time period and a second strobe signal of the plurality of strobe signals transitioning at substantially a seventy-five percent point in the signal transfer time period;

the plurality of control signals including at least one control signal transmitted via the common clock protocol to signal transmission of valid information using the source synchronous protocol.

126. The computer system of claim 125, wherein the at least one signal transmitted using the common clock protocol to signal transmission of the valid information is transmitted during a phase in which the valid information is also transmitted.

127. The computer system of claim 125, wherein the plurality of strobe signals comprises one or more pairs of strobe signals, each of the one or more pairs of strobe signals having a first strobe signal on a first strobe line and a second strobe signal on a second strobe line, the first strobe signal and the second strobe signal having substantially aligned transitions, and wherein each N bits of information transmitted via the second set of signals are transmitted with a pair of the plurality of strobe signals.

128. The computer system of claim 125, wherein the plurality of phases of the bus transaction in which the control signals are asserted comprise a subset of a total plurality of phases of the bus transaction.

129. A bus controller comprising:

a first plurality of signal interfaces to transmit a plurality of control signals for several of a plurality of phases of a bus transaction, the plurality of control signals being transmitted at a common clock frequency according to a common clock protocol; and a second plurality of signal interfaces to transmit a plurality of information signals during one of the plurality of phases of the bus transaction, the plurality of information signals being transmitted in conjunction with a plurality of strobe signals, each of the plurality of strobe signals being on a separate strobe line, the plurality of information signals being transmitted in a source synchronous manner wherein the plurality of strobe signals comprises one or more pairs of strobe signals having complementary waveforms.

130. The bus controller of claim 129, wherein the plurality of information signals is transmitted at a frequency that is a multiple of the common clock frequency.

131. The bus controller of claim 130, wherein the multiple is two and the plurality of strobes are aligned to provide strobe transitions at substantially a twenty-five percent point and substantially a seventy-five percent point of a common clock cycle of the common clock, and wherein the second set of signals is transmitted at substantially a rising edge of the common clock cycle and at substantially a fifty percent point of the common clock cycle.

132. The bus controller of claim 129, wherein the plurality of strobe signals comprises one or more pairs of strobe signals, each of the one or more pairs of strobe signals having a first strobe signal on a first strobe line and a second strobe signal on a second strobe line, the first strobe signal and the second strobe signal having substantially aligned transitions.

133. The bus controller of claim 129, wherein the plurality of information signals comprise address signals, and wherein at least one control signal of the plurality of control signals indicates transmission of a valid address via the address signals.

134. The bus controller of claim 133, wherein the at least one control signal to indicate transmission of the valid address is transmitted during a phase in which the valid address is also transmitted.

135. The bus controller of claim 129, wherein the plurality of information signals comprise data signals, and wherein a data ready signal is sent synchronous to the common clock to indicate transmission of valid data via the data signals.

136. The bus controller of claim 129, wherein each N bits of the second set of signals are transmitted with a pair of the plurality of strobe signals.

137. The bus controller of claim 129, wherein the first set of signals comprises a plurality of control signals communicated according to the common clock protocol for a plurality of phases a bus transaction, and wherein the second set of signals is communicated during one phase of the bus transaction using the source synchronous protocol.

138. The bus controller of claim 129, wherein the bus controller is a part of a memory controller component.

139. The bus controller of claim 129, wherein the bus controller is a part of a processor.

140. A method comprising:

transmitting a first plurality of signals for each of N phases of a bus transaction, the first plurality of signals being transmitted at a common clock frequency according to a common clock protocol;

transmitting a second plurality of signals during M phases of the N phases of the bus transaction, M being less than N, the second plurality of signals being transmitted in conjunction with a plurality of strobe signals, each of the plurality of strobe signals being on a separate strobe line, each strobe signal latches separate data chunks, the second plurality of signals being transmitted in a source synchronous manner.

141. The method of claim 140, wherein the second plurality of signals is transmitted at a frequency that is a multiple of the common clock frequency.

142. The method of claim 141, wherein the multiple is two and the plurality of strobes are aligned to provide strobe transitions at substantially a twenty-five percent point and substantially a seventy-five percent point of a common clock cycle of the common clock signal, and wherein the second set of signals is transmitted at substantially a rising edge of the common clock cycle and at substantially a fifty percent point of the common clock cycle.

143. The method of claim 140, wherein the plurality of strobe signals comprises one or more pairs of strobe signals having complementary waveforms.

144. The method of claim 140, wherein the plurality of strobe signals comprises one or more pairs of strobe signals, each of the one or more pairs of strobe signals having a first strobe signal on a first strobe line and a second strobe signal on a second strobe line, the first strobe signal and the second strobe signal having substantially aligned transitions.

145. The method of claim 140, wherein at least one signal transmitted using the common clock protocol signals transmission of valid information via the second plurality of signals.

146. The method of claim 145, wherein the at least one signal transmitted using the common clock protocol to signal transmission of the valid information is transmitted during a phase in which the valid information is also transmitted.

147. The method of claim 140, wherein a data ready signal is sent synchronous to the common clock to indicate transmission of valid data using the source synchronous protocol.

148. The method of claim 140, wherein each N bits of the second plurality of signals are transmitted with a pair of the plurality of strobe signals.

149. The method of claim 137, wherein the first plurality of signals comprises a plurality of control signals communicated according to the common clock protocol for a plurality of phases of a bus transaction, and wherein the second plurality of signals is communicated during one phase of the bus transaction using the source synchronous protocol.

150. A computer system comprising:
a bus;
a common clock;
a first plurality of signal interfaces to transmit and receive a first plurality of signals for a plurality of phases for a plurality of bus transactions, the plurality of control signals being transmitted at the frequency of the common clock according to a common clock protocol; and
a second plurality of signal interfaces to transfer a second plurality of signals during a subset of the plurality of phases, the second plurality of signals being transmitted in conjunction with a plurality of strobe signals, each of the plurality of strobe signals being on a separate strobe line, each strobe signals latches separate data chunks, the second plurality of signals being transmitted in a source synchronous manner.

151. The computer system of claim 150, wherein the second plurality of signals is transmitted at a frequency that is a multiple of the common clock frequency.

152. The computer system of claim 151, wherein the multiple is two and the plurality of strobes are aligned to provide strobe transitions at substantially a twenty-five percent point and substantially a seventy-five percent point of a common clock cycle of the common clock signal, and wherein the second plurality of signals is transmitted at substantially a rising edge of the common clock cycle and at substantially a fifty percent point of the common clock cycle.

153. The computer system of claim 150, wherein the plurality of strobe signals comprises one or more pairs of strobe signals having complementary waveforms.

154. The computer system of claim 150, wherein the plurality of strobe signals comprises one or more pairs of strobe signals, each of the one or more pairs of strobe signals having a first strobe signal on a first strobe line and a second strobe signal on a second strobe line, the first strobe signal and the second strobe signal having substantially aligned transitions.

155. The computer system of claim 150, wherein at least one signal transmitted using the common clock protocol signals transmission of valid information via the second plurality of signals.

156. The computer system of claim 155, wherein the at least one signal transmitted using the common clock protocol to signal transmission of the valid information is transmitted during a phase in which the valid information is also transmitted.

157. The computer system of claim 150, wherein a data ready signal is sent synchronous to the common clock to indicate transmission of valid data using the source synchronous protocol.

158. The computer system of claim 150, wherein each N bits of the second plurality of signals are transmitted with a pair of the plurality of strobe signals.

159. The computer system of claim 150, wherein the first plurality of signals comprises a plurality of control signals communicated according to the common clock protocol for a plurality of phases of a bus transaction, and wherein the second plurality of signals is communicated during one phase of the bus transaction using the source synchronous protocol.

160. An apparatus comprising:
a bus controller to transmit a first set of signals synchronized to a bus clock using a common clock protocol at a common clock frequency, the first set of signals comprising at least one signal synchronous to the bus clock that signals transmission of a valid data element using a source synchronous protocol;
the bus controller to transmit a second set of signals using the source synchronous protocol, the second set of signals being synchronized to a plurality of strobe signals, each of the plurality of strobe signals being on a separate strobe line, each strobe signal latches separate data chunks.

161. The apparatus of claim 160, wherein the second set of signals is transferred at a frequency that is a multiple of the frequency of the common clock.

162. The apparatus of claim 161, wherein the second set of signals is transferred at twice the frequency of the common clock and the plurality of strobes are aligned to provide strobe transitions at a twenty-five percent point and a seventy-five percent point of a common clock cycle, and wherein the bus controller transmits the second set of signals at a rising edge of the common clock cycle and at a fifty percent point of the common clock cycle.

163. The apparatus of claim 160, wherein the plurality of strobe signals comprises one or more pairs of strobe signals having complementary waveforms.

164. The apparatus of claim 160, wherein the plurality of strobe signals comprises one or more pairs of strobe signals, each of the one or more pairs of strobe signals having a first strobe signal on a first strobe line and a second strobe signal on a second strobe line, the first strobe signal and the second strobe signal having substantially aligned transitions.

165. The apparatus of claim 160, wherein the at least one signal transmitted using the common clock protocol to signal transmission of the valid data element is transmitted during a phase in which the valid data element is also transmitted.

166. The apparatus of claim 160, wherein a data ready signal is sent synchronous to the bus clock to indicate transmission of valid data using the source synchronous protocol.

167. The apparatus of claim 160, wherein each N bits of the second set of signals are transmitted with a pair of the plurality of strobe signals.

168. The apparatus of claim 160, wherein the first set of signals comprises a plurality of control signals communicated according to the common clock protocol for a plurality of phases of a bus transaction, and wherein the second set of signals is communicated during one phase of the bus transaction using the source synchronous protocol.

169. The apparatus of claim 160, wherein the apparatus is a memory controller component.

170. The apparatus of claim 160, wherein the apparatus is a processor.

171. A method comprising:
transmitting a first set of signals synchronized to a bus clock using a common clock protocol at a common clock frequency, the first set of signals comprising at least one signal synchronous to the bus clock that signals transmission of a valid data element using the source synchronous protocol;
transmitting a second set of signals using a source synchronous protocol, the second set of signals being synchronized to a plurality of strobe signals, each of the plurality of strobe signals being on a separate strobe line, each strobe signal latches data chunks.

172. The method of claim 171, wherein the second set of signals is transferred at a frequency that is a multiple of the frequency of the common clock.

173. The method of claim 172, wherein the second set of signals is transferred at twice the frequency of the common clock and the plurality of strobes are aligned to provide strobe transitions at a twenty-five percent point and a seventy-five percent point of a common clock cycle, and wherein the bus controller transmits the second set of signals at a rising edge of the common clock cycle and at a fifty percent point of the common clock cycle.

174. The method of claim 171, wherein the plurality of strobe signals comprises one or more pairs of strobe signals having complementary waveforms.

175. The method of claim 171, wherein the plurality of strobe signals comprises one or more pairs of strobe signals, each of the one or more pairs of strobe signals having a first strobe signal on a first strobe line and a second strobe signal on a second strobe line, the first strobe signal and the second strobe signal having substantially aligned transitions.

176. The method of claim 171, wherein the at least one signal transmitted using the common clock protocol to signal transmission of the valid information is transmitted during a phase in which the valid information is also transmitted.

177. The method of claim 171, wherein a data ready signal is sent synchronous to the bus clock to indicate transmission of valid data using the source synchronous protocol.

178. The method of claim 171, wherein each N bits of the second set of signals are transmitted with a pair of the plurality of strobe signals.

179. The method of claim 171, wherein the first set of signals comprises a plurality of control signals communicated according to the common clock protocol for a plurality of phases of a bus transaction, and wherein the second set of signals is communicated during one phase of the bus transaction using the source synchronous protocol.

180. A computer system comprising:
a bus;
a bus clock;
a processor coupled with the bus, the processor including a bus controller;
the bus controller to transmit a first set of signals synchronized to the bus clock using a common clock protocol at a common clock frequency, the first set of signals comprising at least one signal synchronous to the bus clock that signals transmission of a valid data element using the source synchronous protocol;
the bus controller to transmit a second set of signals using a source synchronous protocol, the second set of signals being synchronized to a plurality of strobe signals, each of the plurality of strobe signals being on a separate strobe line, each strobe signal latches separate data chunks.

181. The computer system of claim 180, wherein the second set of signals is transferred at a frequency that is a multiple of the frequency of the common clock.

182. The computer system of claim 181, wherein the second set of signals is transferred at twice the common clock frequency and the plurality of strobes are aligned to provide strobe transitions at a twenty-five percent point and a seventy-five percent point of a common clock cycle, and wherein the bus controller transmits the second set of signals at a rising edge of the common clock cycle and at a fifty percent point of the common clock cycle.

183. The computer system of claim 180, wherein the plurality of strobe signals comprises one or more pairs of strobe signals having complementary waveforms.

184. The computer system of claim 180, wherein the plurality of strobe signals comprises one or more pairs of strobe signals, each of the one or more pairs of strobe signals having a first strobe signal on a first strobe line and a second strobe signal on a second strobe line, the first strobe signal and the second strobe signal having substantially aligned transitions.

185. The computer system of claim 180, wherein the at least one signal transmitted using the common clock protocol to signal transmission of the valid information is transmitted during a phase in which the valid information is also transmitted.

186. The computer system of claim 180, wherein a data ready signal is sent synchronous to the bus clock to indicate transmission of valid data using the source synchronous protocol.

187. The computer system of claim 180, wherein each N bits of the second set of signals are transmitted with a pair of the plurality of strobe signals.

188. The computer system of claim 180, wherein the first set of signals comprises a plurality of control signals communicated according to the common clock protocol for a plurality of phases of a bus transaction, and wherein the second set of signals is communicated during one phase of the bus transaction using the source synchronous protocol.

189. A bus controller comprising:
a first bus interface to transmit a first set of signals synchronized to a bus clock using a common clock protocol at a common clock frequency; and
a second bus interface to transmit a second set of signals as part of a multi-phase bus transaction, the multi-phase bus transaction being associated with one or more signals of the first set of signals, the second set of signals being transmitted using a source synchronous protocol and being synchronized to a plurality of strobe signals, each of the plurality of strobe signals being on a separate strobe line, each strobe signal latches separate data chunks, the second set of signals also being transmitted with an offset to the plurality of strobe signals and having a timing relationship to said bus clock.

190. The bus controller of claim 189, wherein the second set of signals comprises data signals.

191. The bus controller of claim 189, wherein the second set of signals comprises address signals.

* * * * *